United States Patent
Wright et al.

(10) Patent No.: US 6,533,413 B2
(45) Date of Patent: Mar. 18, 2003

(54) NECK LEASH RETAINING DEVICE FOR EYE WEAR

(76) Inventors: Jeffrey Wright, 2163 Falcon Ridge Dr., Petaluma, CA (US) 94954; Anthony Clumeck, 2163 Falconridge Dr., Petaluma, CA (US) 94954

( * ) Notice: Subject to any disclaimer, the term of this patent is extended or adjusted under 35 U.S.C. 154(b) by 0 days.

(21) Appl. No.: 09/893,949

(22) Filed: Jun. 29, 2001

(65) Prior Publication Data

US 2003/0002010 A1 Jan. 2, 2003

(51) Int. Cl.[7] ................................................. G02C 3/00
(52) U.S. Cl. ........................................ 351/156; 351/157
(58) Field of Search ................................ 351/156, 157, 351/111, 116, 41, 158

(56) References Cited

U.S. PATENT DOCUMENTS

| | | | |
|---|---|---|---|
| 5,087,118 A | * | 2/1992 | Gill .............................. 351/156 |
| 5,369,452 A | * | 11/1994 | Williams ....................... 351/157 |
| 6,053,612 A | * | 4/2000 | Mac Intosh, Jr. et al. .. 351/157 |

* cited by examiner

Primary Examiner—Hung Xuan Dang
(74) Attorney, Agent, or Firm—Kolisch Hartwell, P.C.

(57) ABSTRACT

Neck leash device for retaining eye wear with a resilient leash portion approximately thirty four inches long, a pair of adjustment beads, one for adjusting the leash around the users neck and the other for adjusting the leash around the users head, a leash to eyeglass attachment, the attachment comprised of a length of resilient tubing terminating at one end in a first plastic fastener, the opposite end capable of retaining the ear piece of a pair of glasses, and a mating second plastic fastener that attaches to each end of said leash portion, said mating first and second fasteners comprised of resilient plastic material so that they can snap together and detach from each other in an emergency. A preferred embodiment includes wherein said leash portion is constructed of a lycra covered neoprene strip where said strip is folded over and sewn so that said leash has a hollow portion traveling its entire length. The user is provided with a plurality of first fasteners, each with a different diameter resilient tubing, so that the user can choose a fastener that will snuggly fit to the ear pieces of said eye glasses.

7 Claims, 2 Drawing Sheets

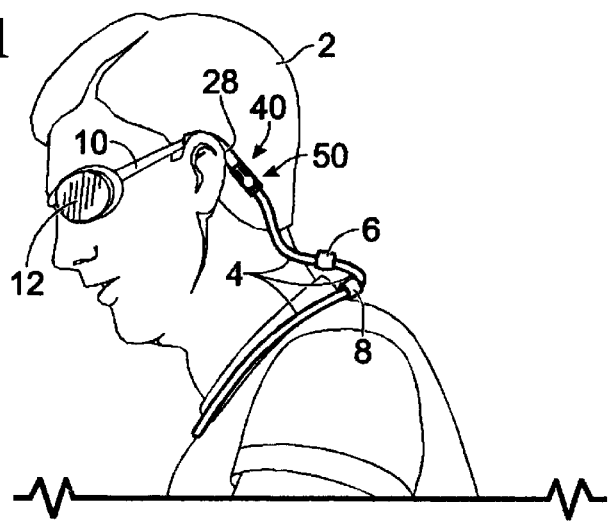
Fig. 1
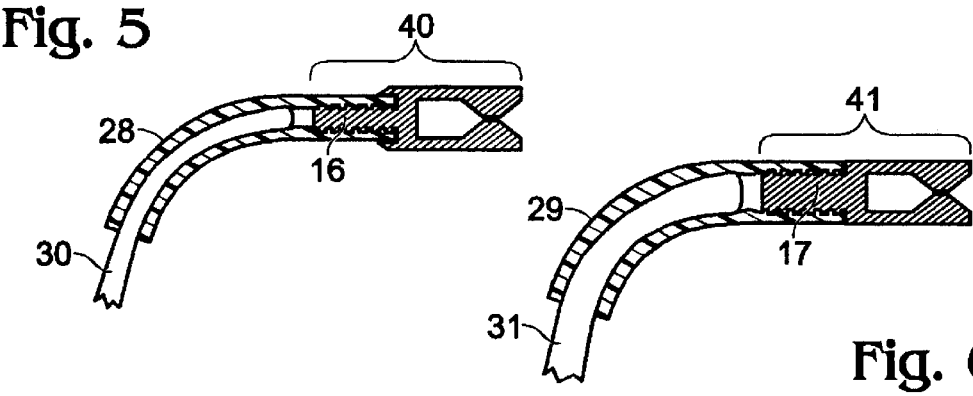
Fig. 5
Fig. 6
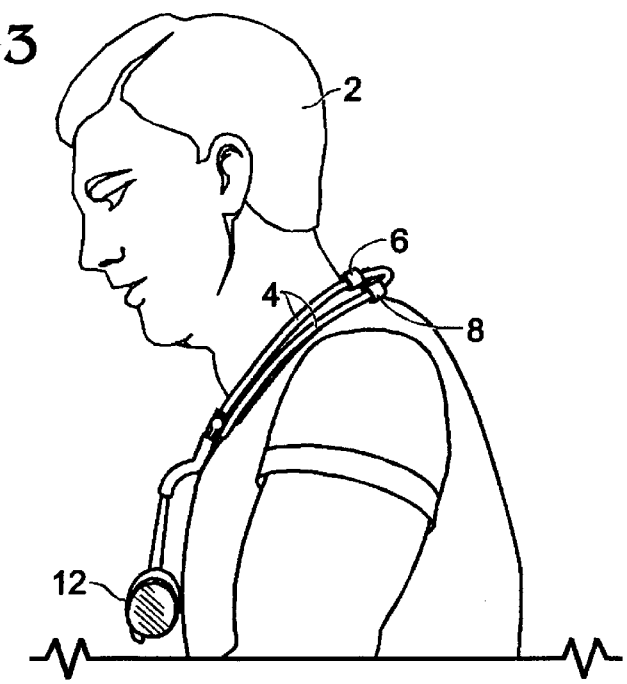
Fig. 3

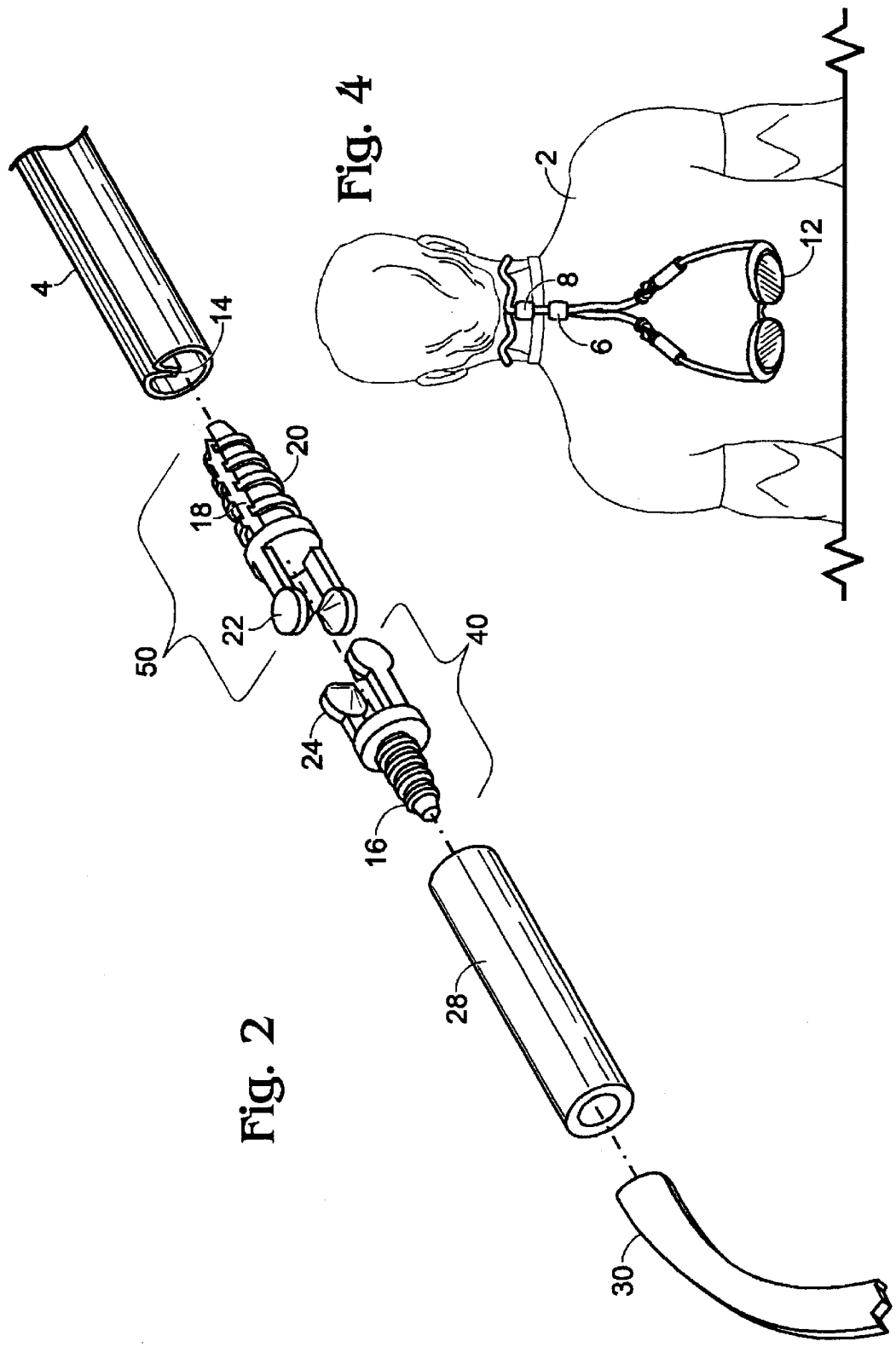

NECK LEASH RETAINING DEVICE FOR EYE WEAR

BACKGROUND OF THE INVENTION

This invention relates generally to the field of eyeglass accessories, and more particularly to a neck leash retaining device for eye wear.

Eyeglasses are known. They are worn to correct a vision impairment, or to shade the eyes by providing a tinted lens that protects the user from the sun's rays. Eyeglasses or goggles can also be worn to protect the eyes in sports activities. People who lead active lives, especially people engaged in various sports find it convenient to have a strap of some sort that attaches to each end of the ear pieces of the eyeglasses so that the strap goes around the user's neck. In this way the user can remove his or her glasses and the glasses are conveniently positioned on the users chest. In this way, the user can have quick access to the glasses. The strap system also provides a measure of safety for the user in that if the glasses are accidentally knocked from the users head, they do not fall to the ground or floor thereby eliminating potential breakage or loss. This is especially helpful in water sports where a person could loose his or her glasses altogether if they accidentally fall off while swimming, surfing or the like.

Although there are straps currently on the market that help hold a persons glasses so that they don't fall to the ground during activity, there are a number of deficiencies in current designs. First, there is no means to allow the user to snuggly retain the strap around his or her head so that the glasses are firmly secure on the users head. Secondly, there is no way for the strap to easily break away from the glasses in times of emergency. Thirdly, current straps can't easily let the attached glasses be stored on the users chest as well as the users back. Finally, current straps can not easily fit snuggly onto glasses with different sized ear piece ends.

SUMMARY OF THE INVENTION

The primary object of the invention is to provide an eye wear retaining device that allows a person to hang his or her glasses on the chest or back.

Another object of the invention is to provide an eye wear retaining device that can be removably attached to glasses regardless of the size of the ear pieces.

Another object of the invention is to provide an eye wear retaining device where the leash or strap portion can be adjusted by means of slidable retaining beads so that the glasses may be tightly or loosely retained on the users head.

A further object of the invention is to provide an eye wear retaining device where the leash or strap portion can securely retain the ear pieces of a pair of glasses and yet disconnect from the glasses in an emergency.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 1 is a side view of a person wearing the Eyeglass retaining device of the present invention.

FIG. 2 is an exploded view of the connection system of the present invention.

FIG. 3 is a side view of a person wearing the present invention while the eyeglasses are resting on the users chest.

FIG. 4 is a back view of a person wearing the present invention while the eyeglasses are resting on the users back.

FIG. 5 is a side section view of an ear piece connector for thin ear pieces.

FIG. 6 is a side section view of an ear piece connector for thick ear pieces.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning first to FIG. 1, a side view of a person 2 wearing an exemplary eyeglass retaining device is shown. The user's eyeglasses 12 are retained at each ear piece 10 by a resilient tube 28, which may also retain a first fastening means 40. Fastening means 40 may removably snap into a second fastening means 50, which in turn may be connected to retaining strap 4. Retaining strap 4 may be approximately thirty four inches long, and adapted to encircle the user's neck.

The glasses, the strap, and an adjustment element, such as a slideable retaining bead 6, collectively define a head loop adapted to encircle the user's head. The slideable retaining bead can be slid all the way to the back of the user's head to thereby size the head loop and secure the glasses to the users head, such as during vigorous activity, as shown by dotted line 7. Similarly, another adjustment element, such as bead 8, can be adjusted to have the leash fit snugly but comfortably around the user's neck. In other words, the adjustment element may be used to selectively size a neck loop defined by the strap and the adjustment element.

FIG. 2 is an exploded view of the connection means of the present invention. Ear piece 10 can snugly slip into resilient tube 28. Tube 28 can be made out of a material such as surgical rubber tubing. First fastener 40 is comprised of a barbed post 26 joined to a universal joint 24. Second fastening means 50 is comprised of universal joint 22 joined to barbed post 20. Universal joints 24 and 22 snap together forming a complete universal joint. In times of emergency, if the eyeglasses need to be quickly pulled away from the user's body, the universal joints 22 and 24 can be separated from each other, thereby allowing the eyeglasses to separate from the strap. Alternative types of known fastening means may be used in place of the universal joint described above, however, the universal joint system described creates a more flexible and adjustable joint that is comfortable for the user. Barbed post 20 is inserted into the hollow portion 16 of strap 4. In the preferred embodiment, strap 4 is made of lycra covered neoprene. The lycra is available in many colors and patterns. The neoprene is one sixteenth of an inch thick and is flexible, resilient, and water resistant. The strip of neoprene is folded over and sewn. The resulting tubular strap is turned inside out so that seam 14 is in the inner diameter of the strap 4. Post 20 of second fastener 50 has a slit 18 molded into it to accommodate seam 14.

FIG. 3 shows a side view of a person 2 wearing an eyewear retention device according to the present invention so that the eyeglasses 12 are resting on the user's chest. In this configuration the user can have easy access to the glasses 12, and thereby put them on and take them off while keeping them in close proximity to the user. FIG. 4 shows an alternate position where the glasses are resting on the user's back. This position can be helpful when the user wants to have the front portion of his or her body clear of articles.

FIG. 5 shows a cross-section view of the first fastening means 40 having a small diameter attachment post 36 that allows a small diameter tube 28 to retain a thin type ear piece 10. FIG. 6 shows a similar cross-section view showing an alternate first fastening means 41 having a larger diameter attachment post 17 that allows a larger diameter tube 29 to retain a thicker type eye piece 11. The user can select the ideal first fastening means 40 or 41 or others, to accommodate his or her eyeglasses.

In the above described and illustrated way, a person can wear the eyeglass leash retaining means of the present invention and in doing so can keep the glasses in a convenient location on the users body. The glasses can quickly separate from the leash in times of emergency. A plurality of fasteners can be provided to the user so that the present invention can be snuggly attached to the users eyeglasses regardless of the thickness or thinness of the ear piece.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A neck leash device for retaining eyewear, comprising:
   a strap portion;
   a pair of adjustment beads, one for adjusting the strap around a user's neck and the other for adjusting the strap around the user's head;
   a first fastener;
   a resilient tube configured to couple an earpiece of the eyewear to the first fastener; and
   a second fastener configured to releasably couple the first fastener to an end of the strap portion.

2. The neck leash device of claim 1, wherein the strap portion is constructed of a lycra covered neoprene strip, the strip being folded over and sewn with a hollow portion traveling its length.

3. The neck leash device of claim 1, wherein the first fastener is one of a plurality of first fasteners, each fastener having a different diameter to facilitate coupling with a corresponding different diameter earpiece via a resilient tube.

4. The neck leash device of claim 1, wherein the strap portion is approximately 34 inches long.

5. An adjustable leash for use with eyewear, comprising:
   a strap with opposing ends adapted to releasably couple with the eyewear;
   a first adjustment element for selectively sizing a neck loop around a user's neck; and
   a second adjustment element for selectively sizing a head loop around a user's head.

6. The leash of claim 5, wherein the neck loop is at least partially defined by a portion of the strap and the first adjustment element.

7. The leash of claim 5, wherein the head loop is at least partially defined by a portion of the strap, the eyewear, and the second adjustment element.

* * * * *